(12) United States Patent
Gu et al.

(10) Patent No.: US 10,007,557 B2
(45) Date of Patent: Jun. 26, 2018

(54) COMPUTING RESOURCE CONTROLLER AND CONTROL METHOD FOR MULTIPLE ENGINES TO SHARE A SHARED RESOURCE

(71) Applicant: VIA Alliance Semiconductor Co., Ltd., Shanghai (CN)

(72) Inventors: Deming Gu, Shanghai (CN); Zhou Hong, Cupertino, CA (US)

(73) Assignee: VIA ALLIANCE SEMICONDUCTOR CO., LTD., Shanghai (CN)

(*) Notice: Subject to any disclaimer, the term of this patent is extended or adjusted under 35 U.S.C. 154(b) by 176 days.

(21) Appl. No.: 15/171,420

(22) Filed: Jun. 2, 2016

(65) Prior Publication Data
US 2017/0161110 A1  Jun. 8, 2017

(30) Foreign Application Priority Data
Dec. 2, 2015 (CN) .......................... 2015 1 0870619

(51) Int. Cl.
*G06F 13/14* (2006.01)
*G06F 9/50* (2006.01)
(Continued)

(52) U.S. Cl.
CPC ........ *G06F 9/5011* (2013.01); *G06F 11/3024* (2013.01); *G06F 11/3041* (2013.01); *G06F 13/366* (2013.01); *G06F 13/4031* (2013.01)

(58) Field of Classification Search
CPC .............. G06F 9/5011; G06F 13/4031; G06F 11/3041; G06F 11/3024; G06F 13/366
See application file for complete search history.

(56) References Cited

U.S. PATENT DOCUMENTS 6,219,728 B1 * 4/2001 Yin ..................... H04L 12/5601
                                                       370/229
8,032,678 B2   10/2011 Tardieux et al.
(Continued)

FOREIGN PATENT DOCUMENTS

CN    101739372        6/2010
GB    2510345 A  *  8/2014  ............ H04W 16/14
(Continued)

OTHER PUBLICATIONS

Chinese language office action dated Oct. 12, 2016, issued in application No. TW 104141656.

*Primary Examiner* — Jing-Yih Shyu
(74) *Attorney, Agent, or Firm* — McClure, Qualey & Rodack, LLP

(57) ABSTRACT

A computing resource controller controlling how multiple engines share a shared resource. The controller has an arbiter, a monitoring module, an arbiter strategy control center, and an arbiter parameter updating module. The arbiter allocates access rights to the shared resource to the engines. The monitor module monitors the demands for the shared resource requested by the engines. Based on monitored results obtained from the monitoring module, the arbiter strategy control center determines an arbiter strategy suitable to the arbiter and, accordingly, the arbiter parameter updating module sets parameters of the arbiter, and the arbiter uses newly-set parameters to allocate the access rights to the shared resource to the engines.

16 Claims, 3 Drawing Sheets

(51) Int. Cl.
    *G06F 13/366*     (2006.01)
    *G06F 11/30*     (2006.01)
    *G06F 13/40*     (2006.01)

(56) References Cited

U.S. PATENT DOCUMENTS

| | | | |
|---|---|---|---|
| 2002/0176431 A1 | 11/2002 | Golla et al. | |
| 2007/0150690 A1* | 6/2007 | Chen | G06F 3/0608 711/170 |
| 2008/0115137 A1* | 5/2008 | Gower | G06F 9/52 718/102 |
| 2009/0274049 A1 | 11/2009 | Lai | |
| 2010/0115167 A1* | 5/2010 | Tardieux | G06F 13/362 710/240 |
| 2011/0119421 A1 | 5/2011 | Basu et al. | |
| 2011/0179422 A1* | 7/2011 | Stegaru | G06F 9/5011 718/104 |
| 2011/0231614 A1* | 9/2011 | Spracklen | G06F 9/45533 711/141 |
| 2012/0096153 A1* | 4/2012 | Weiser | G06F 9/5011 709/224 |
| 2013/0198755 A1* | 8/2013 | Kim | G06F 9/505 718/104 |
| 2015/0199251 A1* | 7/2015 | Buendgen | G06F 9/4881 702/186 |
| 2017/0228257 A1* | 8/2017 | Dong | G06F 9/5027 |

FOREIGN PATENT DOCUMENTS

| | | | | |
|---|---|---|---|---|
| TW | 200947957 | 11/2009 | | |
| TW | TIN 200947957 | 11/2009 | | |
| WO | WO 2014029308 A1 * | 2/2014 | ............ | H04W 24/08 |

* cited by examiner

COMPUTING RESOURCE CONTROLLER AND CONTROL METHOD FOR MULTIPLE ENGINES TO SHARE A SHARED RESOURCE

CROSS REFERENCE TO RELATED APPLICATIONS

This Application claims priority of China Patent Application No. 201510870619.2, filed on Dec. 2, 2015, the entirety of which is incorporated by reference herein.

BACKGROUND OF THE INVENTION

Field of the Invention

The present invention relates to resource allocation arbiters.

Description of the Related Art

Arbiters are electronic devices that allocate access rights to a shared resource to multiple engines.

For bus applications, a bus arbiter is operated to allocate the bus cycles of different data buses to a plurality of engines. A memory arbiter is operated to allocate the access rights to a shared memory to a plurality of engines. Furthermore, an arbiter is also required for a plurality of engines to share a chip, such as a Graphics User Interface chip (GUI chip).

How to increase arbiter efficiency is an important topic in the field of the invention.

BRIEF SUMMARY OF THE INVENTION

A computing resource controller in accordance with an exemplary embodiment of the disclosure has an arbiter, a monitoring module, an arbiter strategy control center and an arbiter parameter updating module. The arbiter allocates access rights to a shared resource to a plurality of engines. The monitoring module monitors the demands for the shared resource requested by the engines. Based on monitored results obtained from the monitoring module, the arbiter strategy control center determines an arbiter strategy suitable to the arbiter. Based on the arbiter strategy determined by the arbiter strategy control center, the arbiter parameter updating module, setting parameters of the arbiter and thereby the arbiter uses newly-set parameters to allocate the access rights to the shared resource to the engines. In this manner, the parameters of the arbiter are dynamically adjusted in accordance with the demands for the shared resource requested by the engines.

In another exemplary embodiment, a control method for a plurality of engines to share a shared resource is shown, which comprises the following steps: providing an arbiter to allocate access rights to the shared resource to the plurality of engines; providing a monitoring module to monitor the demands for the shared resource requested by the engines; and determining an arbiter strategy suitable to the arbiter based on monitored results obtained from the monitoring module to set parameters of the arbiter, and operating the arbiter to use newly-set parameters to allocate the access rights to the shared resource to the engines.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments carrying out the invention. This description is made for the purpose of illustrating the general principles of the invention and should not be taken in a limiting sense. The scope of the invention is best determined by reference to the appended claims.

Figure 1:
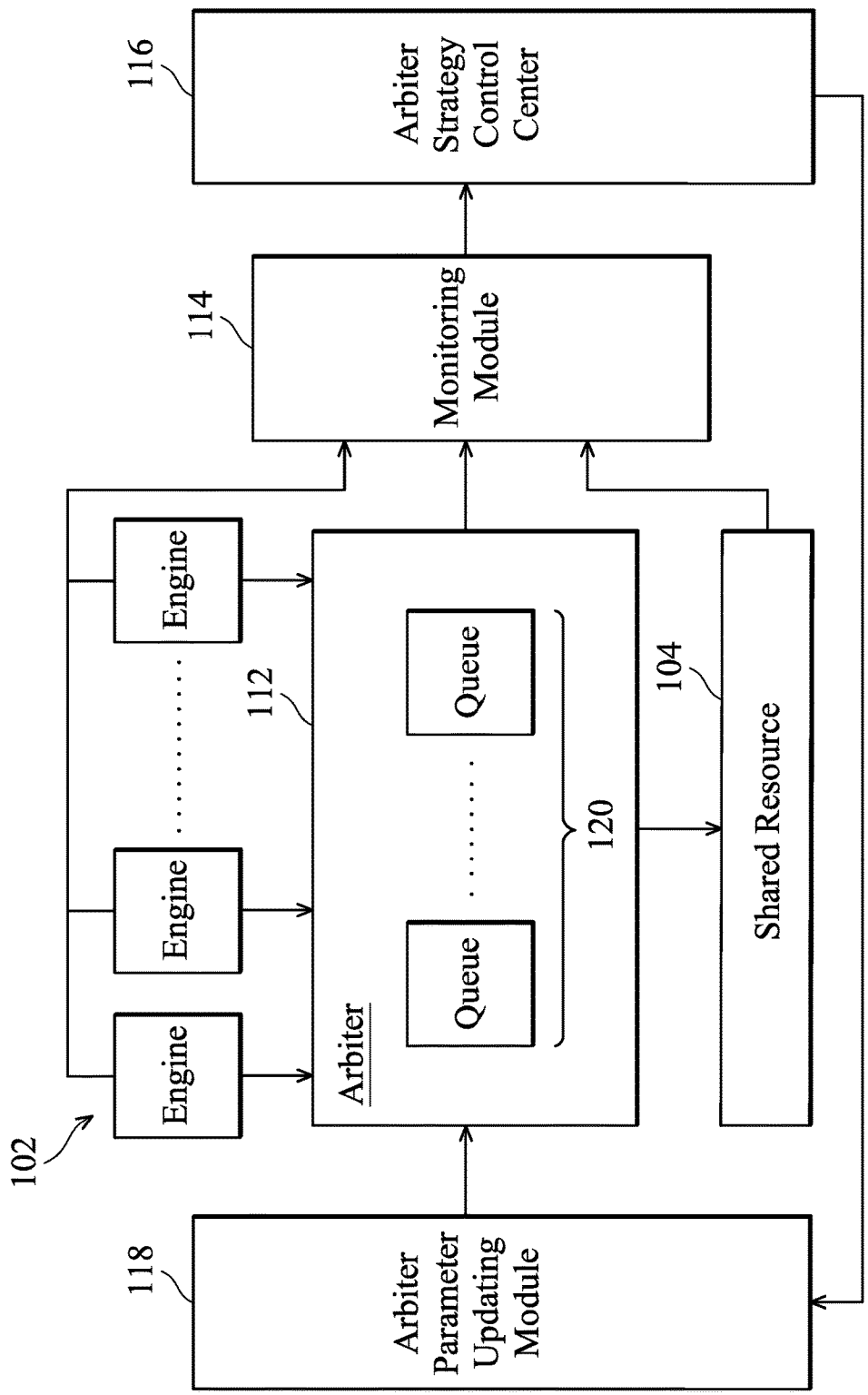
FIG. 1 depicts a computing resource controller, by which multiple engines 102 share a shared resource 104.

FIG. 1 depicts a computing resource controller, by which multiple engines 102 share a shared resource 104. The computing resource controller includes an arbiter 112, a monitoring module 114, an arbiter strategy control center 116 and an arbiter parameter updating module 118.

The arbiter 112 allocates the access rights to the shared resource 104 to the engines 102. The monitoring module 114 monitors the demands for the shared resource 104 requested by the engines 102. According to the monitored results obtained from the monitoring module 114, the arbiter strategy control center 116 determines an arbiter strategy suitable to the arbiter 112. According to the arbiter strategy determined by the arbiter strategy control center 116, the arbiter parameter updating module 118 sets the parameters of the arbiter 112 and then the arbiter 112 allocates the access rights to the shared resource 104 to the engines 102 according to the newly-set parameters. In this manner, the parameters of the arbiter 112 are dynamically adjusted according to the demands for the shared resource 104 requested by the engines 102.

The demands for the shared resource 104 requested by the engines 102 may be monitored at the engine (102) side. In an exemplary embodiment, the monitoring module 114 monitors delayed events of the engines 102 due to the inaccessibility of the shared resource 104. Thus, a back pressure at the engine (102) side is measured.

The demands for the shared resource 104 requested by the engines 102 may be monitored at the arbiter (112) side. In an exemplary embodiment, the arbiter 112 includes a plurality of queues 120. The requests for the shared resource 104 issued from the engines 102 queue in the plurality of queues 120. The monitoring module 114 is operative to: monitoring the amount of requests accumulated in the queues 120 or/and the amount of communication data (workload) issued by the requests accumulated in the queues 120; or/and monitoring the congestion of the queues 120 (i.e., the back pressure of the queues 120 of the arbiter 112).

In an exemplary embodiment, after the arbiter 112 finishes a first round of resource allocation for the engines 102, the arbiter parameter updating module 118 sets the parameters of the arbiter 112 in accordance with the arbiter strategy determined by the arbiter strategy control center 116 as suitable to the arbiter 112. Then, during a second round of resource allocation, the arbiter 112 allocates the access rights to the shared resource 104 to the engines 102 based on the newly updated parameters. The duty periods allocated to the engines 102 by the arbiter 112 based on the original parameters may be summed up as the time interval for the first round of resource allocation. The duty periods allocated to the engines 102 by the arbiter 112 based on the newly-set parameters may be summed up as the time interval for the second round of resource allocation.

Furthermore, the monitoring module 114 further monitors the shared resource 104. Accordingly, the arbiter 112 allocates the access rights to the shared resource 104 to the engines 102 based on the operations of the shared resource 104.

Figure 2:
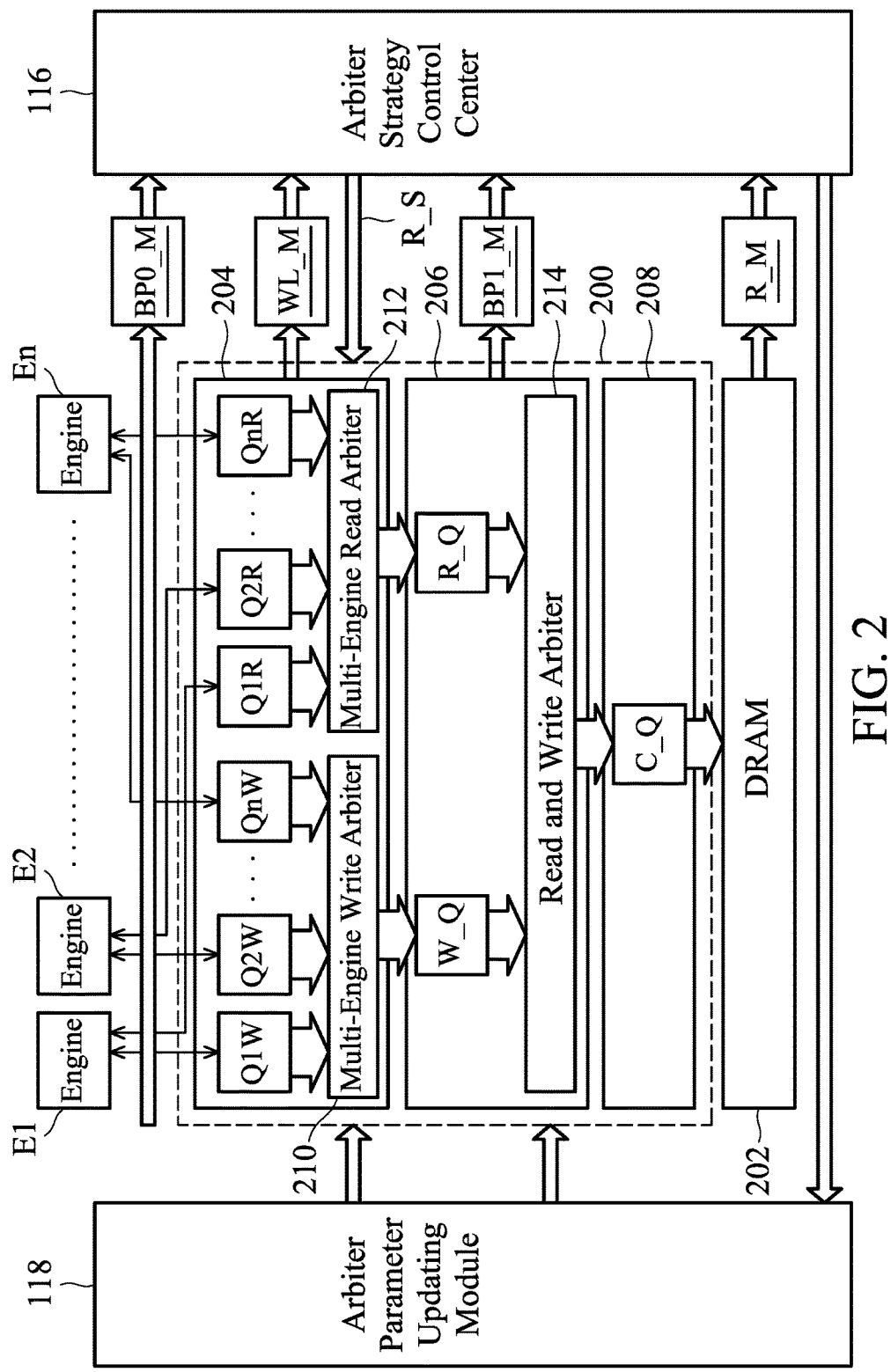
FIG. 2 depicts a computing resource controller in accordance with another exemplary embodiment of the disclosure, which controls a plurality of engines E1, E2 . . . En to access a dynamic random access memory (DRAM) 202.

FIG. 2 depicts a computing resource controller in accordance with another exemplary embodiment of the disclosure, which controls a plurality of engines E1, E2 . . . En to access a dynamic random access memory (DRAM) 202.

As shown in FIG. 2, an arbiter 200 for the DRAM 202 includes three layers 204, 206 and 208. The first layer 204 includes a plurality of write request queues Q1W, Q2W . . . QnW corresponding to the plurality of engines E1, E2 . . . En, a plurality of read request queues Q1R, Q2R . . . QnR corresponding to the plurality of engines E1, E2 . . . En, a multi-engine write arbiter 210, and a multi-engine read arbiter 212. The second layer 206 includes a general write queue W_Q, a general read queue R_Q, and a read and write arbiter 214. The third layer 208 includes a command queue C_Q. The write requests for the DRAM 202 issued from the engines E1, E2 . . . En queue in the write request queues Q1W, Q2W . . . QnW corresponding to the engines E1, E2 . . . En. The read requests for the DRAM 202 issued from the engines E1, E2 . . . En queue in the read request queues Q1R, Q2R . . . QnR corresponding to the engines E1, E2 . . . En. The multi-engine write arbiter 210 allocates the write requests accumulated in the write request queues Q1W, Q2W . . . QnW to the general write queue W_Q. The multi-engine read arbiter 212 allocates the read requests accumulated in the read request queues Q1R, Q2R . . . QnR to the general read queue R_Q. The read and write arbiter 214 allocates the write requests accumulated in the general write queue W_Q and the read requests accumulated in the general read queue R_Q to the command queue C_Q. The access of the DRAM 202 is arranged according to the write/read requests accumulated in the command queue C_Q.

The monitoring module of FIG. 2 includes modules BP0_M, WL_M, BP1_M and R_M. The module BP0_M monitors the delayed events of the engines E1, E2 . . . En due to the inaccessibility of the DRAM 202 (i.e., monitoring of engine back pressure). For example, when a specific engine cannot perform the follow-up actions, the tasks of the specific engine are delayed, which are known as delayed events. In another exemplary embodiment, when the read/write requests of a specific engine cannot be pushed into the corresponding read/write request queue, the tasks of the specific engine are delayed, which are known as delayed events. The module WL_M is operative for workload monitoring. The module WL_M monitors the amount of write requests accumulated in each of the write request queues Q1W, Q2W . . . QnW or/and the burst length issued by the write requests accumulated in each of the write request queues Q1W, Q2W . . . QnW to be written to the DRAM 202. The module WL_M further monitors the amount of read requests accumulated in each of the read request queues Q1R, Q2R . . . QnR or/and the burst length issued from the read requests accumulated in each of the read request queues Q1R, Q2R . . . QnR to be read from the DRAM 202. The module BP1_M monitors the congestion of the general write queue W_Q and the general read queue R_Q. The module R_M monitors the self-refresh operations of each memory bank of the DRAM 202.

The arbiter strategy control center 116 is discussed in this paragraph. The monitored results obtained from the module BP0_M, WL_M, BP1_M and R_M are input to the arbiter strategy control center 116. According to the delayed events of the engines E1, E2 . . . En monitored by the module BP0_M or/and the workload monitoring of the write request queues Q1W, Q2W . . . QnW performed by the module WL_M, the arbiter strategy control center 116 determines an arbiter strategy suitable to the multi-engine write arbiter 210. According to the delayed events of the engines E1, E2 . . . En monitored by the module BP0_M or/and the workload monitoring of the read request queues Q1R, Q2R . . . QnR performed by the module WL_M, the arbiter strategy control center 116 determines an arbiter strategy suitable to the multi-engine read arbiter 212. According to the congestion of the general write queue W_Q and the general read queue R_Q monitored by the module BP1_M, the arbiter strategy control center 116 determines an arbiter strategy suitable to the read and write arbiter 214. According to the monitoring of self-refresh operations of memory banks performed by the module R_M, the arbiter strategy control center 116 provides the arbiter 200 with an indication signal R_S of the self-refresh operations of the memory banks. In this manner, the arbiter 200 allocates the access rights to the DRAM 202 to the engines E1, E2 . . . En based on the self-refresh operations of the memory banks of the DRAM 202.

As shown, according to suitable arbiter strategies determined by the arbiter strategy control center 116, the arbiter parameter updating module 118 adjusts the parameters of the arbiter 200. After a first round of resource allocation for the engines E1, E2 . . . En, the arbiter strategy control center 116 updates the parameters of the arbiter 200 according to the suitable arbiter strategies obtained from the monitored results obtained during the first round of resource allocation. During a second round of resource allocation for the engines E1, E2 . . . En, the arbiter 200 allocates the access rights to the DRAM 202 to the engines E1, E2 . . . En based on the newly-set parameters.

Figure 3:
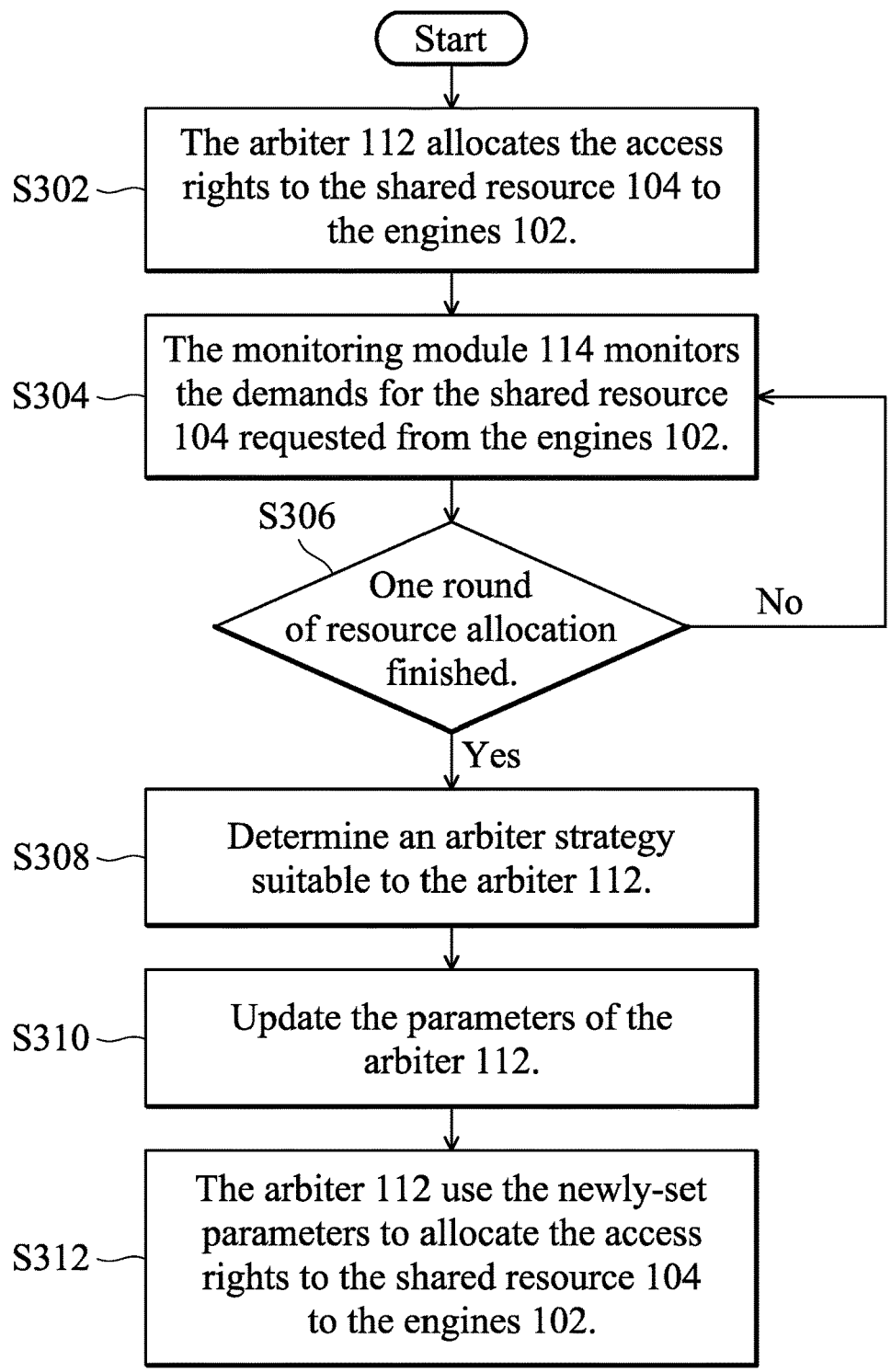
FIG. 3 is a flowchart depicting the operations of the computing resource controller of FIG. 1.

FIG. 3 is a flowchart depicting operations of the computing resource controller of FIG. 1. In step S302, the arbiter 112 allocates the access rights to the shared resource 104 to the engines 102. In step S304, the monitoring module 114 monitors the demands for the shared resource 104 requested by the engines 102. In step S306, it is determined whether a round of resource allocation finishes. If not, step S304 is repeated and the arbiter 112 keeps working without parameter updating. When it is determined in step S306 that a round of resource allocation does finish, step S308 is performed to determine an arbiter strategy suitable to the arbiter 112. In step S310 the parameters of the arbiter 112 are updated. In step S312, the arbiter 112 allocates the access rights to the shared resource 104 to the engines 102 in accordance with the parameters updated in step S310.

According to the aforementioned concepts, a control method for a plurality of engines to share a shared resource is also introduced in the disclosure. With respect to FIG. 1, the control method includes the following steps: providing the arbiter 112 to allocate the access rights to the shared resource 104 to the engines 102; providing the monitoring module 114 to monitor the demands for the shared resource 104 requested by the engines 102; and, based on the monitored results obtained from the monitoring module 114, determining an arbiter strategy suitable to the arbiter 112 to set the parameters of the arbiter 112 accordingly, and then using the newly-set parameters to operate the arbiter 112 to allocate the access rights to the shared resource 104 to the engines 102. The disclosed control method may be adopted for different types of resource sharing. In addition to the DRAM sharing of FIG. 2, the control method of the disclosure may be used in data bus sharing or GUI chip sharing and so on.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computing resource controller, comprising:
    an arbiter, allocating access rights to a shared resource to a plurality of engines;
    a monitoring module, monitoring demands for the shared resource requested by the engines;
    an arbiter strategy control center, determining an arbiter strategy suitable to the arbiter based on monitored results obtained from the monitoring module; and
    an arbiter parameter updating module, setting parameters of the arbiter based on the arbiter strategy determined by the arbiter strategy control center and thereby the arbiter uses newly-set parameters to allocate the access rights to the shared resource to the engines,
    wherein:
    the computing resource controller controls how the engines access a dynamic random access memory;
    the arbiter includes a plurality of write request queues corresponding to the plurality of engines and a plurality of read request queues corresponding to the plurality of engines, and write requests for the dynamic random access memory issued from the engines are queued in the write request queues corresponding to the engines, and read requests for the dynamic random access memory issued from the engines are queued in the read request queues corresponding to the engines;
    the monitoring module monitors an amount of write requests accumulated in each of the write request queues or/and an amount of data issued by the write requests accumulated in each of the write request queues; and
    the monitoring module monitors an amount of read requests accumulated in each of the read request queues or/and an amount of data requested by the read requests accumulated in each of the read request queues.

2. The computing resource controller as claimed in claim 1, wherein:
    after the arbiter finishes a first round of resource allocation for the engines, the arbiter parameter updating module sets the parameters of the arbiter based on the arbiter strategy determined by the arbiter strategy control center; and
    during a second round of resource allocation for the engines, the arbiter allocates the access rights to the shared resource to the engines based on the newly-set parameters.

3. The computing resource controller as claimed in claim 1, wherein:
    the monitoring module monitors the shared resource and the arbiter allocates the access rights to the shared resource to the engines based on operations of the shared resource.

4. The computing resource controller as claimed in claim 1, wherein:
    the monitoring module monitors delayed events of the engines due to inaccessibility of the dynamic random access memory.

5. The computing resource controller as claimed in claim 1, wherein:
    the arbiter includes a general write queue and a general read queue;
    the arbiter further includes a multi-engine write arbiter allocating the write requests accumulated in the write request queues to the general write queue;
    the arbiter further includes a multi-engine read arbiter allocating the read requests accumulated in the read request queues to the general read queue; and
    the monitoring module monitors the congestion of the general write queue and the general read queue.

6. The computing resource controller as claimed in claim 5, wherein:
    the arbiter strategy control center determines an arbiter strategy suitable to the multi-engine write arbiter based on the amount of write requests accumulated in each of the write request queues or/and the amount of data issued by the write requests accumulated in each of the write request queues; and
    the arbiter strategy control center determines an arbiter strategy suitable to the multi-engine read arbiter based on the amount of read requests accumulated in each of the read request queues or/and the amount of data requested by the read requests accumulated in each of the read request queues.

7. The computing resource controller as claimed in claim 6, wherein:
    the arbiter further includes a read and write arbiter and a command queue;
    the read and write arbiter allocates the write requests in the general write queue and the read requests in the general read queue to the command queue;
    the dynamic random access memory is accessed in accordance with the command queue; and
    the arbiter strategy control center determines an arbiter strategy suitable to the read and write arbiter based on the congestion of the general write queue and the general read queue.

8. The computing resource controller as claimed in claim 1, wherein:
    the monitoring module monitors self-refresh operations of each memory bank of the dynamic random access memory and, accordingly, the arbiter allocates the engines to access the dynamic random access memory based on the self-refresh operations.

9. A control method for a plurality of engines to share a shared resource, comprising:
    providing an arbiter to allocate access rights to the shared resource to the plurality of engines;
    providing a monitoring module to monitor demands for the shared resource requested by the engines; and
    determining an arbiter strategy suitable to the arbiter based on monitored results obtained from the monitoring module to set parameters of the arbiter, and operating the arbiter to use newly-set parameters to allocate the access rights to the shared resource to the engines,
    wherein:
    according to the control method, how the engines access a dynamic random access memory is controlled;
    the arbiter includes a plurality of write request queues corresponding to the plurality of engines and a plurality of read request queues corresponding to the plurality of engines, and write requests for the dynamic random access memory issued from the engines are queued in the write request queues corresponding to the engines, and read requests for the dynamic random access memory issued from the engines are queued in the read request queues corresponding to the engines;

the monitoring module monitors an amount of write requests accumulated in each of the write request queues or/and an amount of data issued by the write requests accumulated in each of the write request queues; and the monitoring module monitors an amount of read requests accumulated in each of the read request queues or/and an amount of data requested by the read requests accumulated in each of the read request queues.

10. The control method as claimed in claim 9, determining the arbiter strategy suitable to the arbiter and setting the parameters of the arbiter based on the arbiter strategy suitable to the arbiter after the arbiter finishes a first round of resource allocation for the engines, wherein the arbiter uses the newly-set parameters to allocate the access rights to the shared resource to the engines during a second round of resource allocation for the engines.

11. The control method as claimed in claim 9, wherein:
the monitoring module monitors the shared resource and the arbiter allocates the access rights to the shared resource to the engines based on operations of the shared resource.

12. The control method as claimed in claim 9, wherein:
the monitoring module monitors delayed events of the engines due to inaccessibility of the dynamic random access memory.

13. The control method as claimed in claim 9, wherein:
the arbiter includes a general write queue and a general read queue;
the arbiter further includes a multi-engine write arbiter allocating the write requests accumulated in the write request queues to the general write queue;
the arbiter further includes a multi-engine read arbiter allocating the read requests accumulated in the read request queues to the general read queue; and
the monitoring module monitors the congestion of the general write queue and the general read queue.

14. The control method as claimed in claim 13, further comprising:
determining an arbiter strategy suitable to the multi-engine write arbiter based on the amount of write requests accumulated in each of the write request queues or/and the amount of data issued by the write requests accumulated in each of the write request queues; and
determining an arbiter strategy suitable to the multi-engine read arbiter based on the amount of read requests accumulated in each of the read request queues or/and the amount of data requested by the read requests accumulated in each of the read request queues.

15. The control method as claimed in claim 14, wherein:
the arbiter further includes a read and write arbiter and a command queue;
the read and write arbiter allocates the write requests in the general write queue and the read requests in the general read queue to the command queue;
the dynamic random access memory is accessed in accordance with the command queue; and
an arbiter strategy suitable to the read and write arbiter is determined based on the congestion of the general write queue and the general read queue.

16. The control method as claimed in claim 9, wherein:
the monitoring module monitors self-refresh operations of each memory bank of the dynamic random access memory and, accordingly, the arbiter allocates the engines to access the dynamic random access memory based on the self-refresh operations.

* * * * *